Sept. 11, 1962     J. F. PERRIN     3,052,970
RETAINER RING REMOVER TOOL
Filed June 23, 1958
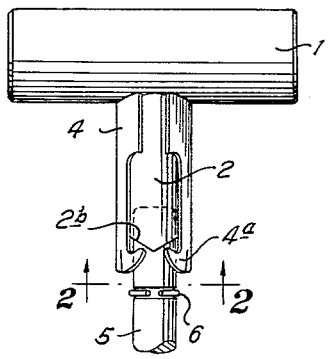
Fig. 1
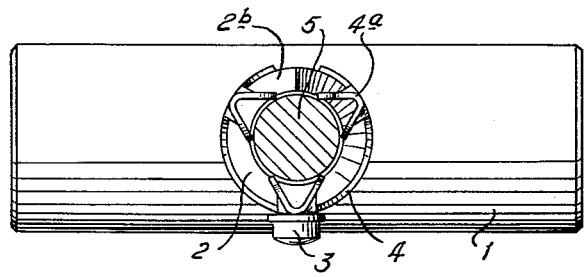
Fig. 2
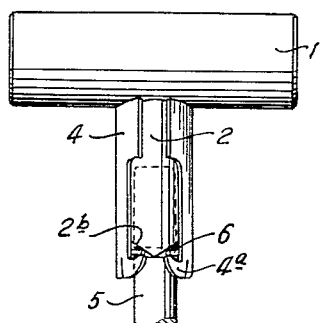
Fig. 3
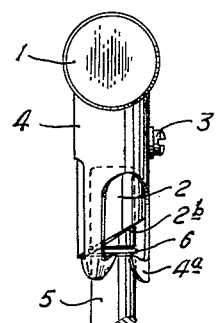
Fig. 4
Fig. 5
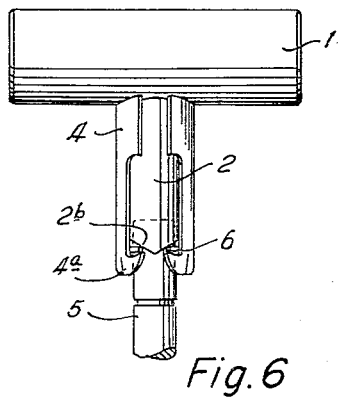
Fig. 6
INVENTOR
Joe F. Perrin
BY *Ashley & Ashley*
ATTORNEYS 3,052,970
RETAINER RING REMOVER TOOL
Joe F. Perrin, 219 E. 3rd St., Taylor, Tex.
Filed June 23, 1958, Ser. No. 743,868
7 Claims. (Cl. 29—229)

This invention relates to new and useful improvements in tools for the removal of retainer rings.

The invention is particularly directed to tools for the removal of retainer or snap rings from annular grooves upon shafts such as the rotor shafts of automobile starters.

It is well known that the removal of retainer or snap rings from rotor shafts of automobile starters and the like is difficult and time consuming when ordinary shop tools are employed and sometimes results in damage or loss of the ring and, in some cases, the damage of the rotor shaft beyond repair.

The primary object of this invention is to provide an improved tool for the removal of the retainer or snap rings which furnishes the means for very rapid, safe and easy removal of such rings.

A construction designed to carry out the invention will be hereinafter described, together with other features of the invention.

The invention will be more readily understood from a reading of the following specification and by reference to the accompanying drawings, wherein examples of the invention are shown, and wherein:

FIG. 1 is a front elevational view illustrating a ring removing tool constructed in accordance with this invention and showing the tool initially engaged over a rotor shaft, FIG. 2 is an enlarged, cross-sectional view taken on line 2—2 of FIG. 1, FIG. 3 is a view similar to the FIG. 1 showing the tool engaged over the ring and the ring partially spread, FIG. 4 is a side elevational view taken at right angles to FIG. 3, FIG. 5 is a view similar to FIGS. 1 and 3 showing the ring pressed downwardly from the retaining groove, and FIG. 6 is a view similar to FIG. 5 showing the ring being removed from the shaft.

In the drawings, the numeral 1 designates a handle carrying a cam or tubular member 2, the lower end of the tubular member 2 being cut at an angle to form a cam edge 2b terminating in a downwardly projecting angular point adapted for introduction into the opening or gap of a conventional snap or retaining ring. A hook member 4 in the form of a split sleeve is adapted to telescope the tubular member 2 and to be secured thereon by a suitable screw 3. The sleeve member 4 is provided with a plurality of downwardly extending hook elements or fingers 4a having inwardly directed shoulders or hooks on their lower ends for engagement beneath a snap or retainer ring. It is noted that the tool structure positions one of the hook elements or fingers 4a diametrically opposite the angular point of the cam edge 2b.

The tool is adapted for use in the removal of retainer rings positioned near the end portions of shafts such as the rotor shafts of automobile starters. Such a shaft 5 is shown in the drawings as carrying a retainer ring 6 compressed into an annular groove surrounding the shaft 5. The tool is slipped downwardly over the outer end of the shaft as shown in FIG. 1, the shaft being received in the tubular member 2, and the tool being rotationally positioned to aline the angular point of the cam edge 2b with the gap of the retainer ring. The tool is then moved downwardly over the shaft as shown in FIG. 3, causing the cam point to enter into the ring gap while at the same time the hook elements 4a snap over and beneath the retaining ring. Continued downward movement spreads the retaining ring and moves it downwardly from the shaft groove as shown in FIG. 5, the hook elements 4a preventing tilting of the retaining ring so that it is readily drawn upwardly over and removed from the shaft by the hook elements as shown in FIG. 6, when the tool is retracted from telescoping relationship with the shaft.

These retainer rings are not spring-like in nature and once they have been spread, they will remain spread for removal from the shaft. For reapplication, the ring is merely alined with the shaft groove and returned to a contracted position by means of hand pliers or other suitable tools, in the usual and conventional manner.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A tool for removing retainer rings from grooves including, a handle, a tubular member extending from the handle and terminating in an outer end, the outer end of the tubular member being cut in a single plane disposed at an angle with respect to the longitudinal axis of the member to form a cam edge inclined with respect to said axis, and a plurality of spaced hook members surrounding the tubular member and having hook elements surrounding the cam edge and facing toward the handle and cam edge.

2. A tool as set forth in claim 1 wherein the cam edge terminates in a point.

3. A tool as set forth in claim 1 wherein the hook elements are disposed in a plane perpendicular to the longitudinal axis of the tubular member and intersecting the cam edge.

4. A tool as set forth in claim 1 wherein the hook members are formed on a split resilient sleeve telescoped by the tubular member.

5. A tool for removing retainer rings from grooves including, a handle, a tubular member extending from the handle and terminating in an outer end, the outer end of the tubular member being cut in a single plane disposed at an angle with respect to the longitudinal axis of the member to form a cam edge inclined with respect to said axis, and a plurality of spaced hook members surrounding the tubular member and terminating in outer ends facing in the same direction as the outer end of the tubular member, and hook elements on the outer ends of the hook members surrounding the cam edge and facing inwardly toward the cam edge.

6. A tool for removing retainer rings from grooves including, a handle having a tubular portion extending therefrom and terminating in an outer end, the outer end of the tubular portion being cut in a single plane disposed at an angle with respect to the longitudinal axis of the tubular portion to form a cam edge inclined with respect to the said axis, said cam edge terminating in a point, and a plurality of spaced hook members surrounding the tubular portion, the hook members terminating in outer ends facing in the same direction as the outer end of the tubular portion, and hook elements on the outer ends of the hook members surrounding the cam edge and facing inwardly toward the cam edge, at least one of the hook elements being positioned diametrically opposite the point of the cam edge and being disposed in a plane perpendicular to said longitudinal axis and passing through the cam edge point.

7. A tool for removing retainer rings from annular grooves on shafts including, a handle having a tubular portion thereon adapted to receive the shaft, the tubular portion extending from the handle and terminating in an outer end, the outer end of the tubular portion being cut generally in a single plane disposed at an angle with respect to the longitudinal axis of the tubular portion to form a cam edge generally inclined with respect to said axis, said cam edge terminating at its portion most remote from the handle in a retainer ring spreading section, and retainer means carried by the tubular portion for engaging and holding the spread ring as said ring is withdrawn from the shaft.

References Cited in the file of this patent

UNITED STATES PATENTS

| | | |
|---|---|---|
| 963,584 | Kenoyer | July 5, 1910 |
| 1,343,351 | Collins | June 15, 1920 |
| 1,366,857 | Zetzman | Jan. 25, 1921 |
| 1,381,890 | Brouhard et al. | June 14, 1921 |
| 2,177,231 | Tinnerman | Oct. 24, 1939 |
| 2,403,216 | Gottlieb | July 2, 1946 |
| 2,614,318 | McCord | Oct. 21, 1952 |